No. 809,607. PATENTED JAN. 9, 1906.
A. CHUNDELAH.
TEA STRAINER HOLDER.
APPLICATION FILED NOV. 5, 1904.
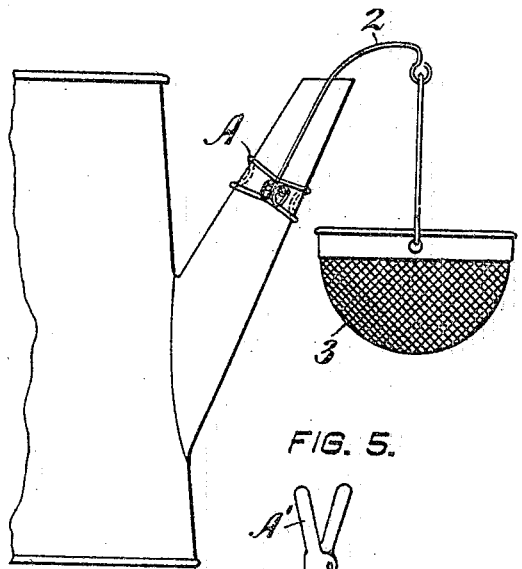
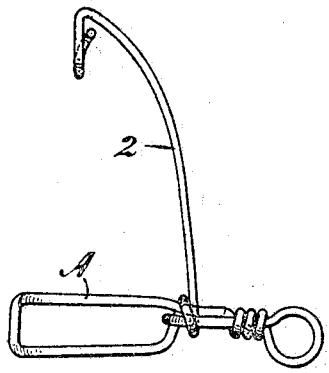
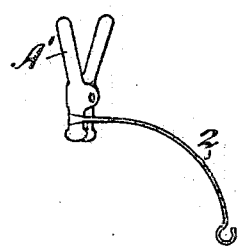
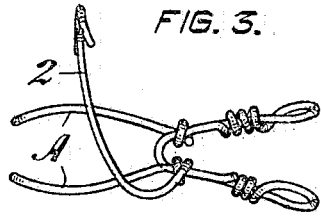
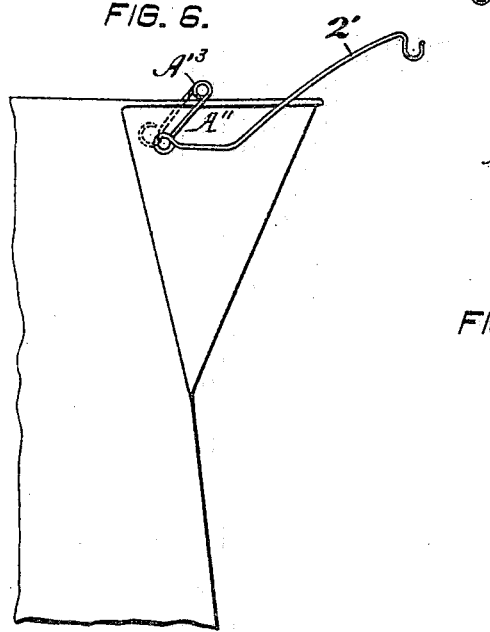
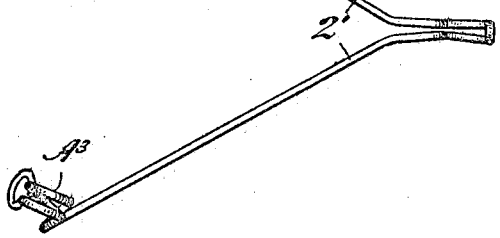
WITNESSES,
Chas. E. Chapin.
INVENTOR,
Abraham Chundelah
By Geo. H. Strong. Atty

UNITED STATES PATENT OFFICE.

ABRAHAM CHUNDELAH, OF SAN FRANCISCO, CALIFORNIA.

TEA-STRAINER HOLDER.

No. 809,607.      Specification of Letters Patent.      Patented Jan. 9, 1906.

Application filed November 5, 1904. Serial No. 231,582.

*To all whom it may concern:*

Be it known that I, ABRAHAM CHUNDELAH, a citizen of the United States, residing in the city and county of San Francisco and State of California, have invented new and useful Improvements in Tea-Strainer Holders, of which the following is a specification.

My invention relates to improvements in means for holding a strainer on the spout of a tea or coffee pot or on the edge of a dipper, ladle, or other vessel.

Strainer-holders as generally constructed are adapted to be thrust into the spout-opening and directly into the path of the discharging liquid, with the result that they are rapidly corroded and destroyed, besides choking up more or less the discharge-opening.

The object of my invention is to provide a simple cheap practical detachable holder that is adapted to clasp the outside of a spout of any description and to be entirely out of range of the contaminating influence of the liquids to be strained and which device can also be attached to a dipper or ladle where it is desired to dip up soups and other liquids that may need straining.

The invention consists of the parts and the construction and combination of parts, as hereinafter more fully described and claimed, having reference to the accompanying drawings, in which—

Figure 1 shows the application of my invention. Fig. 2 is a side elevation of holder. Fig. 3 is a plan view of same. Fig. 4 is a plan view of Fig. 1. Fig. 5 is a perspective and Fig. 6 is a side elevation of holders of slightly-modified form. Fig. 7 is an enlarged plan view of the holder shown in Fig. 6.

A represents a spring-clip of any suitable description adapted to grip the outside of the spout of a teapot—for instance, proximate to its end—and having a rod or wire 2 soldered or otherwise fastened to it or made integral with it and extending out over or to one side of the end of the spout and beyond the spout, from which rod the basket or strainer 3 is suspended.

Sometimes the clip A will be attached to the spout from the side, and again it may be attached from the top and stand in the plane of the spout between the latter and the body of the pot, the rod being bent accordingly. In any event the rod is attached to one jaw of the clip and is so disposed that no part of the metal except the screen in the basket is allowed to come at all in contact with the pouring liquid.

The rod terminates in a hook to allow of the ready attachment and detachment of the basket and permit the proper swivel movement of the basket, so that the latter will always hang in the immediate path of the liquid, no matter how the pot may be held in pouring the liquid, whether with the nozzle straight, as it should be, or more or less to one side. The basket being hung outside the end of the spout, it adjusts itself so that it will always operate properly.

Fig. 5 shows a holder A', adapted to engage over the rim of the open spout of an ordinary coffee-pot, with no part of the holder to be injuriously affected by the liquid.

Fig. 3 shows a holder made entirely from a single piece of spring-wire ingeniously bent so as to form the two jaws, the spring-hinge, the finger-holds, and the basket-supporting rod.

While this same holder is adapted to grasp the edge of a dipper, ladle, bucket, or other receptacle which it may be desired to pour from, I have shown in Fig. 6 a special form of holder A" for the strainer made of spring-wire and having the rod 2' forked and terminating in the spring-clips A³ to grasp the edge of the dish at more or less widely-separated points.

It is possible that various modifications in my invention may be made without departing from the principle thereof, and I do not wish to be understood as limiting myself to the specific construction as herein shown and described.

Having thus described my invention, what I claim, and desire to secure by Letters Patent, is—

1. As an article of manufacture a holder of the character described comprising a single piece of wire bent to form opposed jaws and opposed finger-holds and an intermediate spring-hinge, said jaws adapted to grip the exterior of a vessel, said wire being extended substantially laterally to and provided with means forming a swivel-support for a straining-basket.

2. As an article of manufacture, a holder of the character described comprising a single piece of wire fashioned to form opposed jaws at one portion and opposed finger-holders at another and opposite portion, and a spring portion intermediate of the jaws and finger-holds, said jaws adapted to grip the outside of a vessel and said wire having one terminal extended laterally so that it may extend forward of the spout of the vessel, and said extended terminal having means forming a swivel-support for a straining-basket.

3. As an article of manufacture, a holder of the character described comprising opposed jaws and opposed finger-holds and an intermediate hinge portion, and a rod projecting laterally from the jaw portion and having its outer end provided with means forming a swivel-support for a straining-basket.

In testimony whereof I have hereunto set my hand in presence of two subscribing witnesses.

ABRAHAM CHUNDELAH.

Witnesses:
S. H. NOURSE,
HENRY P. TRICOU.